US006971696B1

(12) United States Patent
Koester et al.

(10) Patent No.: US 6,971,696 B1
(45) Date of Patent: Dec. 6, 2005

(54) HAY BALE SPIKE ASSEMBLY

(75) Inventors: Jay Koester, Manchester, IA (US); Jeff Freiburger, Manchester, IA (US)

(73) Assignee: Attachment Technologies, Inc., Delhi, IA (US)

( * ) Notice: Subject to any disclaimer, the term of this patent is extended or adjusted under 35 U.S.C. 154(b) by 0 days.

(21) Appl. No.: 10/708,113

(22) Filed: Feb. 10, 2004

(51) Int. Cl.[7] .............................................. A01D 87/12
(52) U.S. Cl. .................... 294/120; 294/61; 414/24.5; 414/607; 414/911
(58) Field of Search ................... 294/61, 120, 122, 294/123, 125; 414/24.5, 607, 911

(56) References Cited

U.S. PATENT DOCUMENTS

| | | | |
|---|---|---|---|
| 2,684,164 A * | 7/1954 | Violette | 414/607 |
| 4,040,534 A * | 8/1977 | Kenworthy | 414/703 |
| 4,090,616 A | 5/1978 | Runyan et al. | |
| 4,120,405 A | 10/1978 | Jones et al. | |
| 4,165,008 A | 8/1979 | Faust et al. | |
| 4,583,900 A | 4/1986 | Cooley | |
| 4,619,579 A * | 10/1986 | Frison | 414/607 |
| 4,634,336 A | 1/1987 | Pearce | |
| 4,648,769 A | 3/1987 | Stirling | |
| 4,674,786 A | 6/1987 | Lynch | |
| 4,930,974 A * | 6/1990 | Langenfeld et al. | 414/631 |
| 5,129,775 A * | 7/1992 | Coats et al. | 414/24.5 |
| 5,178,505 A * | 1/1993 | Smith | 414/24.5 |
| 5,240,365 A | 8/1993 | Lynch et al. | |
| 5,556,245 A * | 9/1996 | Moss | 414/24.5 |
| 5,603,597 A | 2/1997 | Clay, Sr. | |
| 5,882,163 A | 3/1999 | Tilley | |
| 5,890,864 A | 4/1999 | Sloan | |
| 6,848,883 B2 * | 2/2005 | Atencio | 414/724 |

* cited by examiner

Primary Examiner—Dean J. Kramer
(74) Attorney, Agent, or Firm—Ryan N. Carter

(57) ABSTRACT

A lift truck assembly for impaling, lifting, and transporting large bales of hay. The assembly has a frame that is adapted for attachment to a standardized Industrial Truck Association (ITA) carriage. The assembly frame has several forwardly projecting spikes for impaling and carrying the bale of hay.

12 Claims, 3 Drawing Sheets

HAY BALE SPIKE ASSEMBLY

BACKGROUND OF INVENTION

This invention relates generally to hay harvesting and storage. More particularly, this invention relates to an attachment for lifting and transporting a large bale of hay.

Past developments in farming have increased the use of relatively large rolled bales of forage crops, such as hay. These round bales normally weigh between 800 and 2,000 pounds, and typically measure 4 to 5 feet in diameter and are 4 to 5 feet long. The handling of these large hay bales presents problems in moving the bales from one location to another for purposes such as storage, feeding, and the like.

Devices for impaling, lifting, and transporting large rolled bales of hay have been developed in the past. Many of these prior art devices attach to the front of various farm vehicles and use spikes or spears to impale, lift, and transport the bales of hay. One problem in the use of prior art bale spike attachments is the lost time and inconvenience involved with engaging and disengaging such attachments from the vehicle. U.S. Pat. No. 4,120,405 discloses a bale spike assembly that attaches to the front and rear of a farm tractor for impaling and transporting bales of hay. U.S. Pat. No. 4,674,786 discloses a bale spike assembly that attaches onto a forklift or small farm tractor. The engagement and disengagement of these devices to and from the tractor or forklift is inconvenient because the bale spike assemblies comprise heavy welded frames which are necessary to support the weight of the hay bale.

Another problem with the prior art patents referenced in the previous paragraph is that they do not allow for the attachment of any other device to the vehicle while the bale spike assembly is attached. This is inconvenient for farmers who often must use several vehicle attachments in order to accomplish one task. For example, a farmer may need to move a bale of hay in order to reach a pallet of boxes in a barn. In order to reach this pallet, the farmer must remove whatever attachment is on the vehicle before the bale spike is attached. Then after the hay bale is transported, the bale spike attachment must be removed, and the pallet fork attachment must then be attached in order to move the pallet of boxes. This attachment/detachment of various tools to the vehicle wastes the farmer's time and energy since attachment tools are usually very heavy and difficult to attach/detach.

Yet another problem with the above referenced prior art bale spike devices is that their attachment means are not completely standardized. One solution to this standardization problem which is not widely used in agricultural applications is to have a standardized carriage onto which the hay bale spike attaches. This kind of carriage has a standardized configuration, the specifications of which have been defined by an association of lift truck manufacturers known as the "Industrial Truck Association" (abbreviated ITA), and includes upper and lower spaced horizontal bars joined through suitable interconnecting plates located adjacent the opposite ends of the carriage. The upper edge of the upper carriage bar is formed with a standardized lip for accommodating, through the hook, mounting of various attachments on the carriage.

Therefore, it is an object of the present invention to provide a hay bale spike attachment that can be mounted on a conventional widely used ITA carriage.

Another object of the present invention is to provide an agricultural use for the ITA carriage, which is traditionally only used for industrial applications.

Another object of the present invention is to provide a hay bale spike attachment that can be attached to the carriage of a lift truck contemporaneously with other attachment tools.

Another object of the invention is to provide a hay bale spike attachment that is light weight and easy to attach/detach to/from the carriage.

Another object of the invention is to provide a hay bale spike attachment that is sturdy yet is also compact so that it is convenient to store when not in use.

SUMMARY OF INVENTION

The present invention combines a standardized Industrial Truck Association (ITA) carriage with a hay bale spike assembly. The ITA carriage is attached to the hydraulic arm of a lift truck. The hay bale spike assembly is then attached to the ITA carriage so that the lift truck can manipulate the bale spike assembly to pierce, raise, and transport a bale of hay.

The hay bale spike assembly has a base frame that is comprised of one fully welded piece. One large upper spike protrudes forwardly from the base frame and is adapted to pierce a hay bale. The large upper spike and the base frame are used to support the majority of the hay bale's weight as the bale is lifted and transported. Also mounted on the assembly's base frame below the upper spike are one or two smaller spikes that are adapted to pierce a bale of hay. The smaller spikes provide additional stability and support for the hay bale during lifting and transport operations.

The spike assembly of the present invention is adapted to be mounted onto an ITA standardized carriage. In addition to the strength and stability provided by the spike assembly's base frame, the ITA carriage frame provides structural integrity and stability for the bale spike assembly as the hay bale is lifted and transported. This additional strength provided by the ITA carriage allows the spike assembly to remain lightweight and not require a heavy base frame. In most instances, the spike assembly can be easily mounted onto the carriage by only one person.

The hay bale spike assembly can be attached to the carriage without having to remove any lift truck attachment tools that may already be attached to the carriage. For example, the present invention allows for the attachment/detachment of the bale spike assembly to the ITA carriage while a pallet fork attachment remains attached to the carriage.

DETAILED DESCRIPTION

Figure 1:
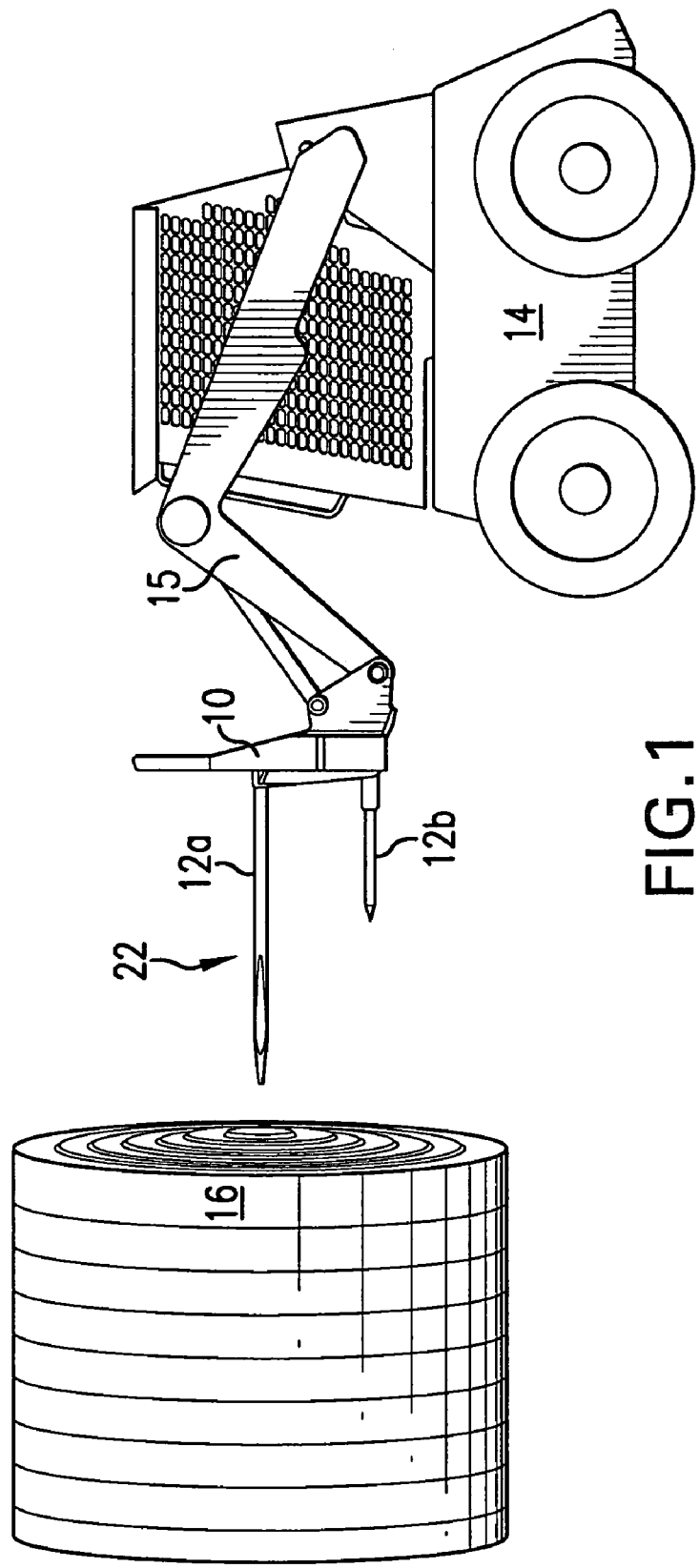
FIG. 1 is a perspective view showing a lift truck with the hay bale spike assembly of the present invention mounted on the carriage.

As seen in FIG. 1, the present invention comprises a hay bale spike assembly 22 with means for attaching to a standard Industrial Truck Association (ITA) carriage 10. The ITA carriage 10 is attached to the hydraulic arm 15 of a lift truck 14. The hay bale spike assembly 22 is then attached to the ITA carriage 10 so that the lift truck 14 can manipulate the spikes 12a, 12b to pierce, raise, and transport a bale of hay 16.

Figure 2:
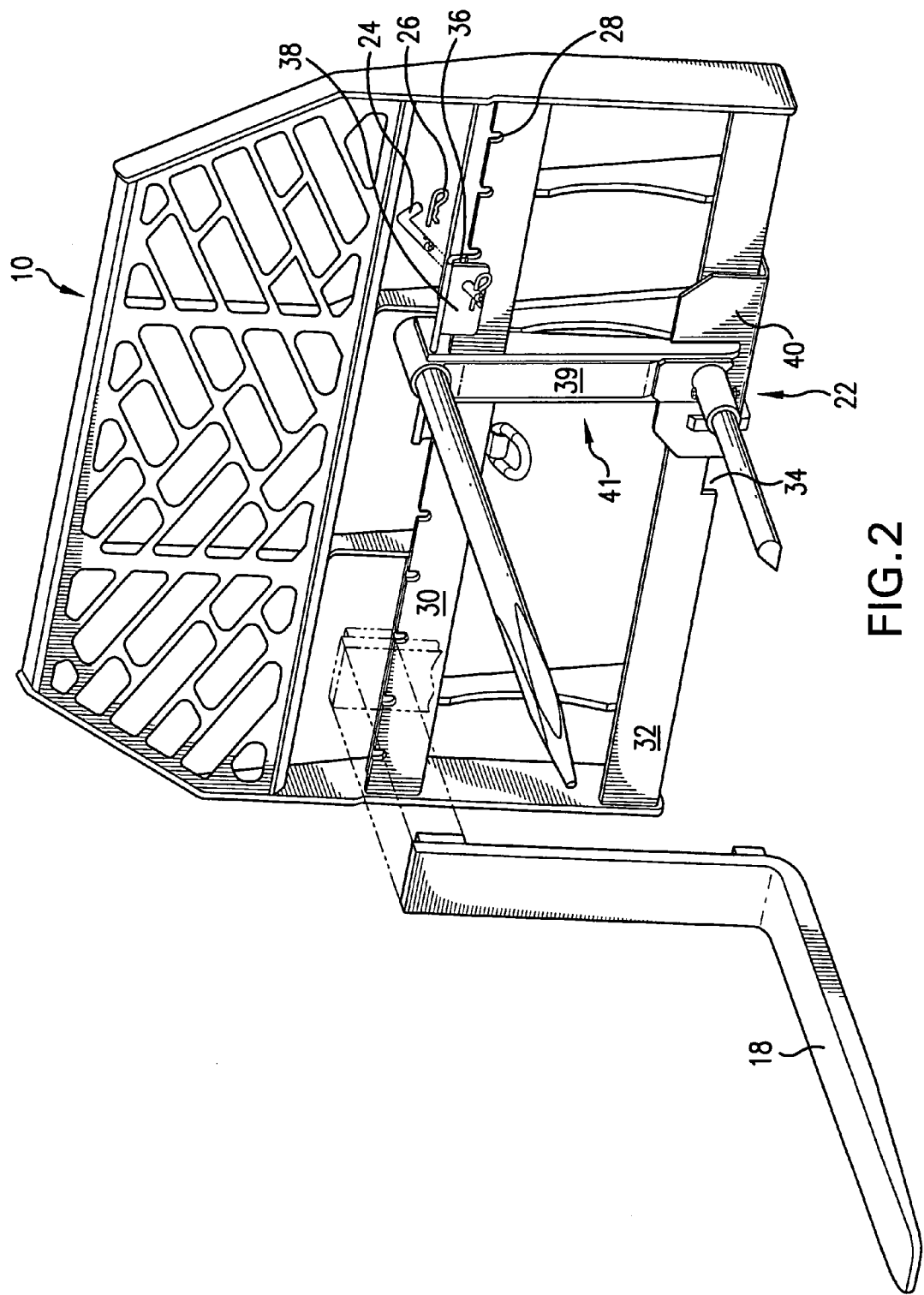
FIG. 2 is a perspective view showing the spike assembly attached to the carriage.
Figure 3B:
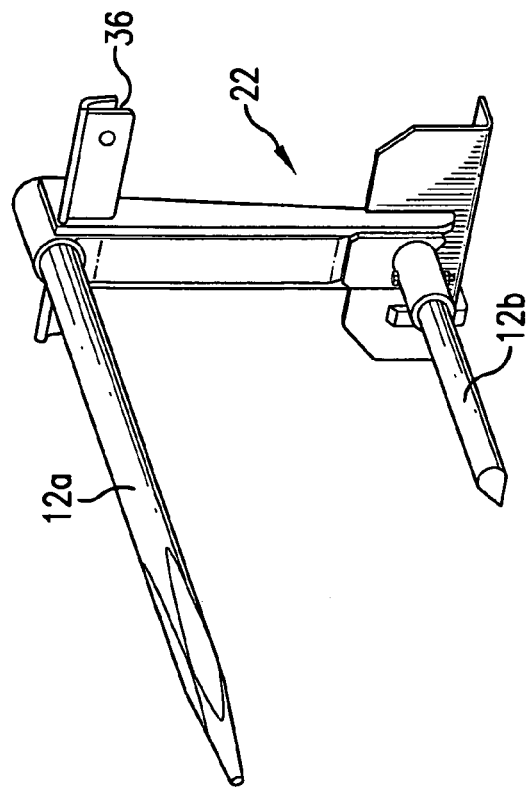
FIGS. 3a and 3b are perspective views showing different embodiments of the spike assembly having different spike configurations.
Figure 3A:
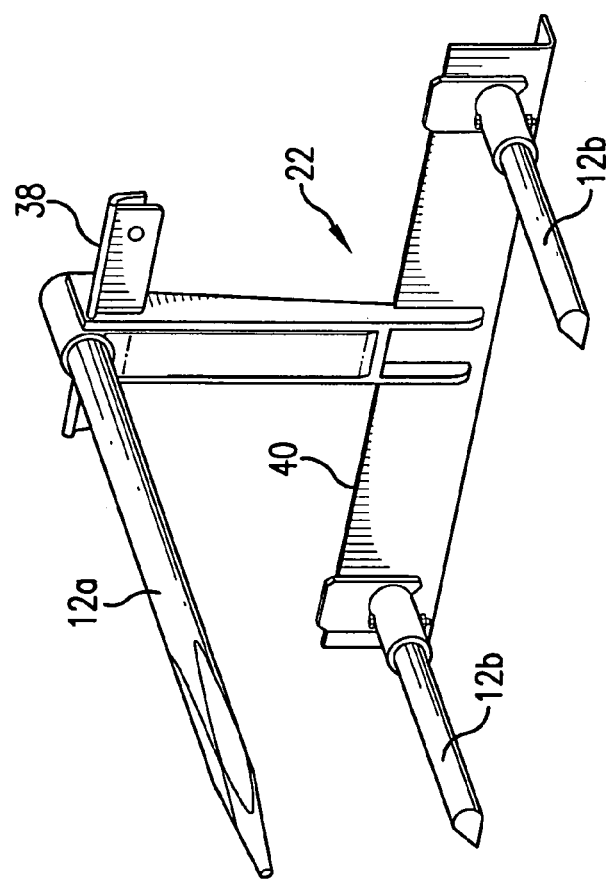

As seen in FIGS. 2 and 3, the spike assembly 22 has a base frame 41 that is comprised of an upper horizontal member 38 and a lower horizontal member 40 separated by a vertical member 39. This base frame 41 is made of structural steel and the components are welded at appropriate points for strength. Spikes 12a, 12b are combined with the base frame 41 to support the hay bale's 16 weight during lifting and transport. The spikes 12a, 12b are separately removable from the base frame which allows maintenance and replacement of damaged or broken spikes 12a, 12b.

Spikes 12a, 12b can be arranged in different configurations depending on bale load and user preference. In a first embodiment of the present invention, the spike assembly 22 comprises a single upper spike 12a projecting forwardly from the base frame 41, and two lower spikes 12b that project forwardly from the base frame 41. The two lower spikes 12b are generally below, and on either side of the upper spike 12a. In a second embodiment, there is only one lower spike 12b instead of two. In this embodiment, the lower spike 12b is generally directly below the upper spike 12a. In both embodiments, the upper spike 12a is longer and thicker than the lower spike(s) 12b. The upper spike 12a is preferably combined with the base frame 41 using a nut, while the lower spikes 12b are preferably combined with the base frame 41 using cross bolts.

As seen in FIG. 2, a main feature of the present invention is that the spike assembly 22 is adapted to be attached to a standard ITA carriage 10. A standard ITA carriage includes an upper horizontal carriage bar 30 and lower horizontal carriage bar 32 which are joined through suitable interconnecting plates located adjacent the opposite ends of the carriage. The upper edge of the upper carriage bar 30 is formed with a standardized lip for accommodating the mounting of various attachments on the carriage 10. The spike assembly 22 is quickly and easily connected to the carriage 10 by first placing the spike assembly 22 near the center of the carriage 10 and resting the spike assembly groove 36 on the upper lip of the upper carriage bar 30. The spike assembly grove 36 is formed on the spike assembly upper portion 38 preferably by two separate plates with a gap in their middle forming the groove 36. Next, the lower portion of the spike assembly 40 is mounted onto the carriage 10 by sliding a portion of it through a notch 34 near the middle of the lower carriage bar 32. The entire spike assembly 22 is then moved laterally away from the notch 34. This secures the spike assembly 22 to the carriage 10 because once the spike assembly lower member 40 is mounted, the spike assembly 22 can only be removed from the carriage 10 when its lower member 40 is aligned with the notch 34 on the lower carriage bar 32. When the spike assembly 22 is in its desired position on the carriage 10, an attachment pin 24 is pushed through a hole in the spike assembly upper member 38. The pin 24 is aligned with a selected one of the carriage notches 28 formed in the upper surface of the upper carriage bar 30. This prevents the spike assembly 22 from moving laterally relative to the carriage 10. A locking pin 26 may be used to prevent the attachment pin 24 from inadvertently being removed from the spike assembly upper member 38.

In addition to the strength and stability provided by the spike assembly's base frame, the ITA carriage frame 10 provides structural integrity and stability for the bale spike assembly 22 as the hay bale 16 is lifted and transported. This additional strength provided by the ITA carriage 10 allows the removable spike assembly 22 to not have need of a heavy base frame in order to lift hay bales 16. Because of this, the spike assembly 22 can carry extremely heavy hay bales 16 while the removable spike assembly 22 portion remains lightweight, compact, and easy to store when not in use. Preferably, the spike assembly 22 embodiment comprising one lower spike 12b weighs between 60 and 70 pounds. The relatively light weight of this embodiment allows it to be easily carried and mounted onto the carriage 10 by only one person.

As seen in FIG. 2, the spike assembly 22 can be attached to the carriage 10 without removing the pallet forks 18 (or other attachment tool that may be on the lift truck). This increases a farmer's efficiency because it reduces the time and energy spent attaching and detaching attachment tools to the lift truck in-between uses of the bale spike assembly 22. Additionally, allowing the pallet forks 18 to remain attached while the bale spike assembly 22 is being used provides stability when raising and transporting the hay bale 16. In this regard, the pallet forks 18 can be used as an additional spike to penetrate the hay bale 16, or the pallet forks 18 may be positioned under the hay bale 18 to help support its weight.

Having thus described the invention in connection with the preferred embodiments thereof, it will be evident to those skilled in the art that various revisions can be made to the preferred embodiments described herein with out departing from the sprit and scope of the invention. It is my intention, however, that all such revisions and modifications that are evident to those skilled in the art will be included with in the scope of the following claims.

What is claimed is as follows:

1. A bale spike support assembly adapted for attachment to a carriage having an upper carriage member and a lower carriage member, said assembly comprising:

a base frame having an upper horizontal beam member, a lower horizontal beam member, and a laterally disposed member connecting the upper and lower beam members, said base frame having a front side and a rear side;

an upper spike combined with the base frame, said upper spike projecting forwardly from the front side of the base frame;

a lower spike combined with the base frame, said lower spike being positioned below the upper spike and projecting forwardly from the front side of the base frame;

wherein the base frame upper horizontal beam member has a hole for receiving an attachment pin; and said attachment pin is adapted to be placed through a notch on the upper carriage member so as to keep the bale spike support assembly from moving laterally relative to the carriage.

2. The bale spike support assembly of claim 1 wherein the bale spike support assembly weighs between 60 and 70 pounds.

3. The bale spike support assembly of claim 1 wherein the upper spike is longer and thicker than the lower spike.

4. The bale spike support assembly of claim 1 further comprising a second lower spike combined with the base frame, both said lower spikes being positioned below the upper spike and projecting forwardly from the front side of the base frame.

5. The bale spike support assembly of claim 1 wherein the upper spike and the lower spike are removably combined with the base frame.

6. A bale spike support assembly for use with a lift truck vehicle, said bale spike support assembly comprising:
- a base frame having an upper horizontal beam member, a lower horizontal beam member, and a laterally disposed member connecting the upper and lower beam members, said base frame having a front side and a rear side;
- wherein the base frame is adapted to be combined with a standard Industrial Truck Association (ITA) carriage having an upper carriage bar and a lower carriage bar;
- the base frame upper horizontal beam member being adapted to be combined with the upper carriage bar, and the lower horizontal beam member being adapted to be combined with the lower carriage bar;
- an upper spike combined with the base frame, said upper spike projecting forwardly from the front side of the base frame; and
- at least one lower spike combined with the base frame, said lower spike being positioned below the upper spike and projecting forwardly from the front side of the base frame;
- wherein the base frame upper horizontal beam member has a groove which is adapted to combine with the upper carriage bar.

7. The bale spike support assembly of claim 6 wherein the bale spike support assembly weighs between 60 and 70 pounds.

8. The bale spike support assembly of claim 6 wherein the upper spike is longer and thicker than the lower spike.

9. The bale spike support assembly of claim 6 further comprising a second lower spike combined with the base frame, both said lower spikes being positioned below the upper spike and projecting forwardly from the front side of the base frame.

10. The bale spike support assembly of claim 6 wherein the upper spike and the lower spike are removably combined with the base frame.

11. A bale spike support assembly for use with a lift truck vehicle, said bale spike support assembly comprising:
- a base frame having an upper horizontal beam member, a lower horizontal beam member, and a laterally disposed member connecting the upper and lower beam members, said base frame having a front side and a rear side;
- wherein the base frame is adapted to be combined with a standard Industrial Truck Association (ITA) carriage having an upper carriage bar and a lower carriage bar;
- the base frame upper horizontal beam member being adapted to be combined with the upper carriage bar, and the lower horizontal beam member being adapted to be combined with the lower carriage bar;
- an upper spike combined with the base frame, said upper spike projecting forwardly from the front side of the base frame; and
- at least one lower spike combined with the base frame, said lower spike being positioned below the upper spike and projecting forwardly from the front side of the base frame;
- wherein the lower carriage bar has a notch for receiving a portion of the base frame lower horizontal beam member.

12. A bale spike support assembly for use with a lift truck vehicle, said bale spike support assembly comprising:
- a base frame having an upper horizontal beam member, a lower horizontal beam member, and a laterally disposed member connecting the upper and lower beam members, said base frame having a front side and a rear side;
- wherein the base frame is adapted to be combined with a standard Industrial Truck Association (ITA) carriage having an upper carriage bar and a lower carriage bar;
- the base frame upper horizontal beam member being adapted to be combined with the upper carriage bar, and the lower horizontal beam member being adapted to be combined with the lower carriage bar;
- an upper spike combined with the base frame, said upper spike projecting forwardly from the front side of the base frame;
- at least one lower spike combined with the base frame, said lower spike being positioned below the upper spike and projecting forwardly from the front side of the base frame;
- wherein base frame upper horizontal beam has a hole for receiving an attachment pin; and
- said attachment pin is adapted to be placed through a notch on the upper carriage bar so as to keep the bale spike support assembly from moving laterally relative to the carriage.

\* \* \* \* \*